United States Patent [19]
Wooh

[11] 4,000,075
[45] Dec. 28, 1976

[54] SEDIMENTATION TANK WITH ROTARY YIELDABLE RAKE ARM STRUCTURE

[75] Inventor: Thomas Wooh, Wilton, Conn.

[73] Assignee: Dorr-Oliver Incorporated, Stamford, Conn.

[22] Filed: Dec. 31, 1975

[21] Appl. No.: 645,589

[52] U.S. Cl. .............................. 210/525; 210/528
[51] Int. Cl.² ...................................... B01D 21/18
[58] Field of Search ........... 210/83, 523, 525, 528, 210/531, 532 S, 534

[56] References Cited
UNITED STATES PATENTS

| | | | |
|---|---|---|---|
| 2,437,761 | 3/1948 | Scott | 210/531 |
| 3,295,835 | 1/1967 | Klopper | 210/528 X |
| 3,542,207 | 11/1970 | Stansmore | 210/528 X |

Primary Examiner—Frank W. Lutter
Assistant Examiner—William Cuchlinski, Jr.
Attorney, Agent, or Firm—Theodore M. Jablon; Burtsell J. Kearns

[57] ABSTRACT

Continuously operating sedimentation tank wherein a load yieldable composite rotary rake arm structure is constructed and arranged to conform to the compound slope of the tank bottom, while being dragged over the tank bottom by draft means connecting it to a driving arm spaced upwardly from the rake arm structure.

12 Claims, 11 Drawing Figures

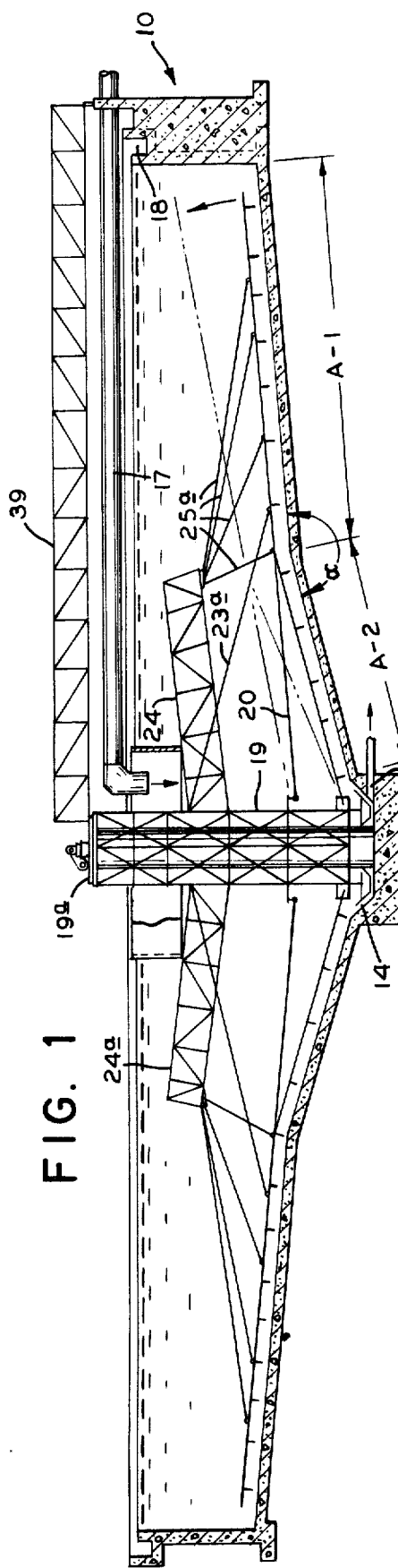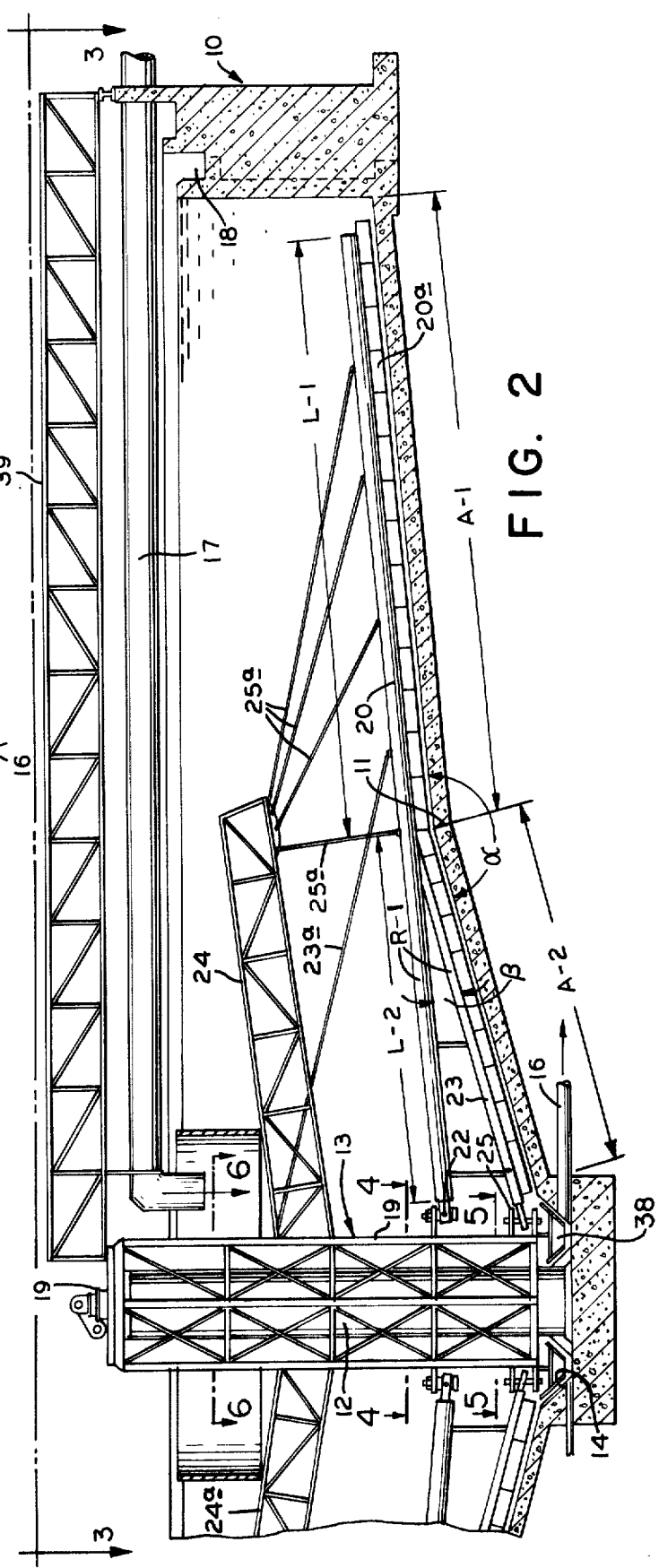

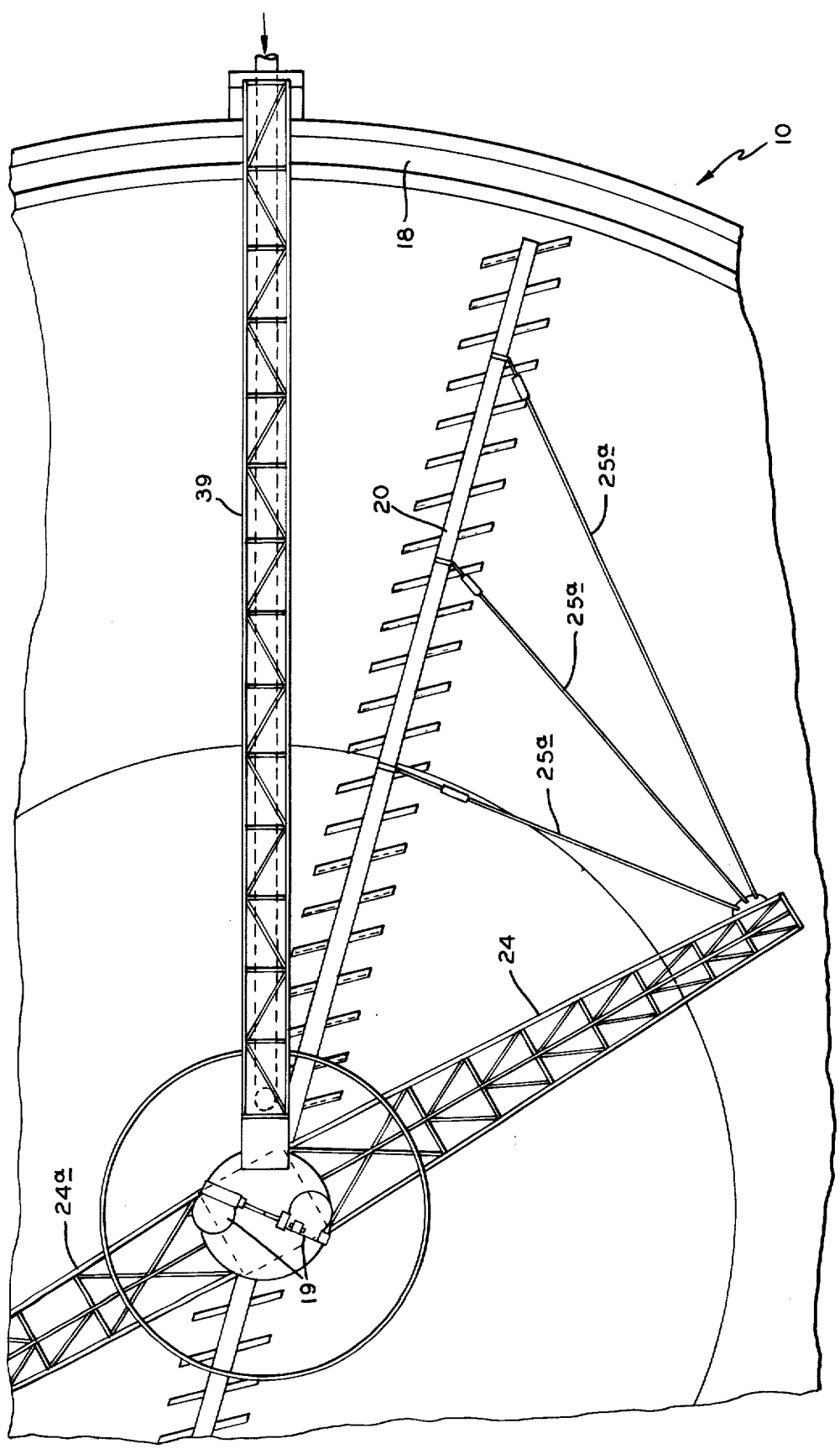

U.S. Patent  Dec. 28, 1976  Sheet 3 of 4  4,000,075
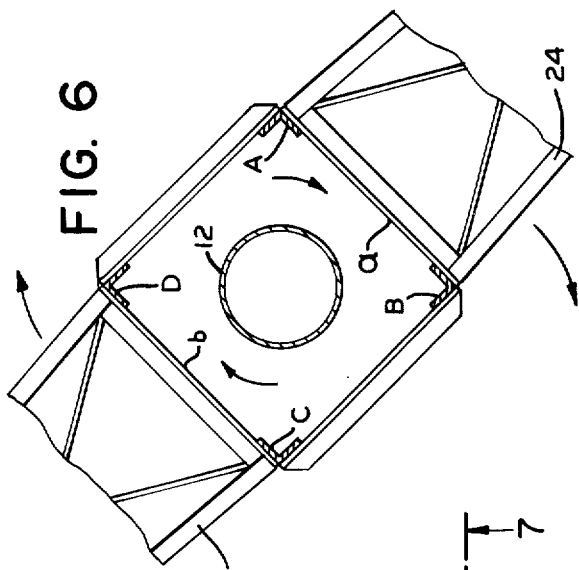
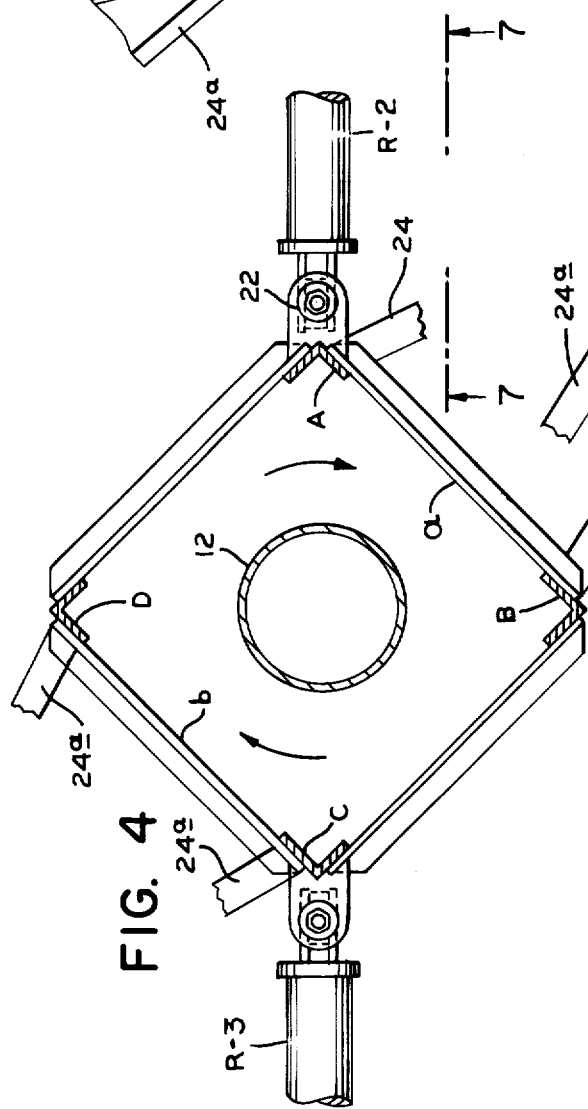
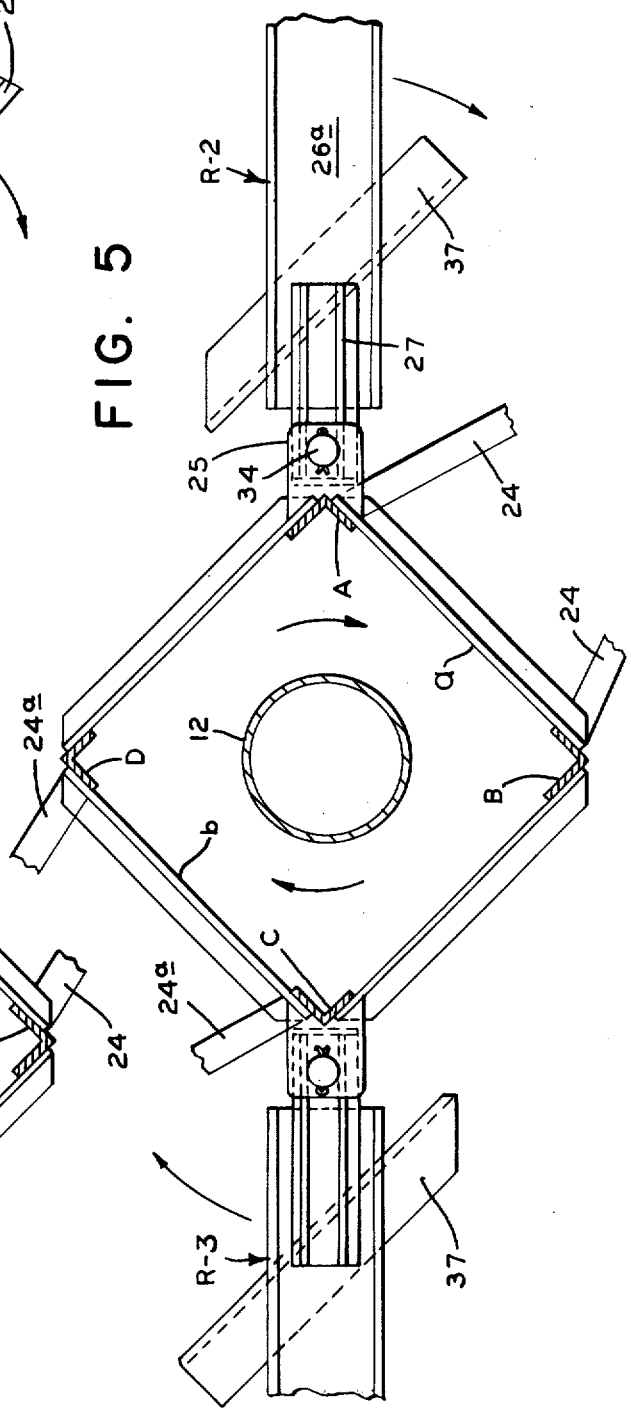

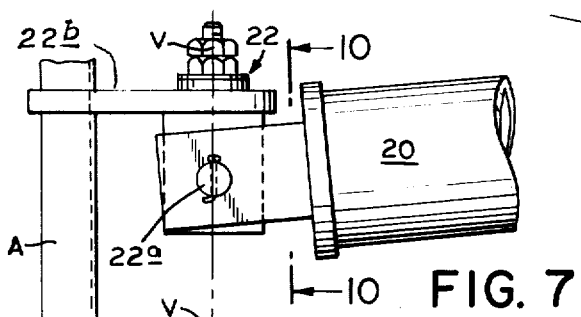
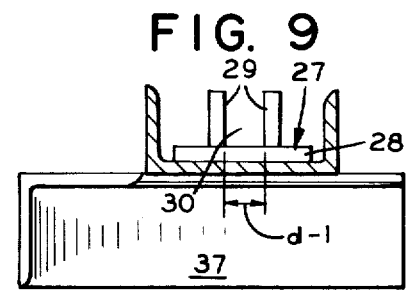
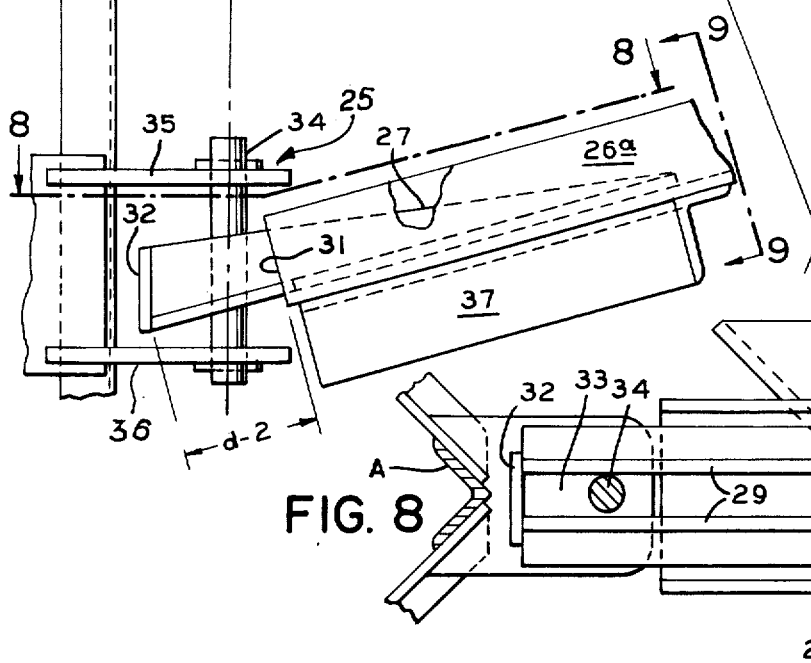
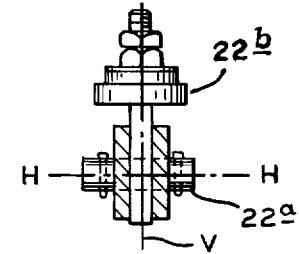
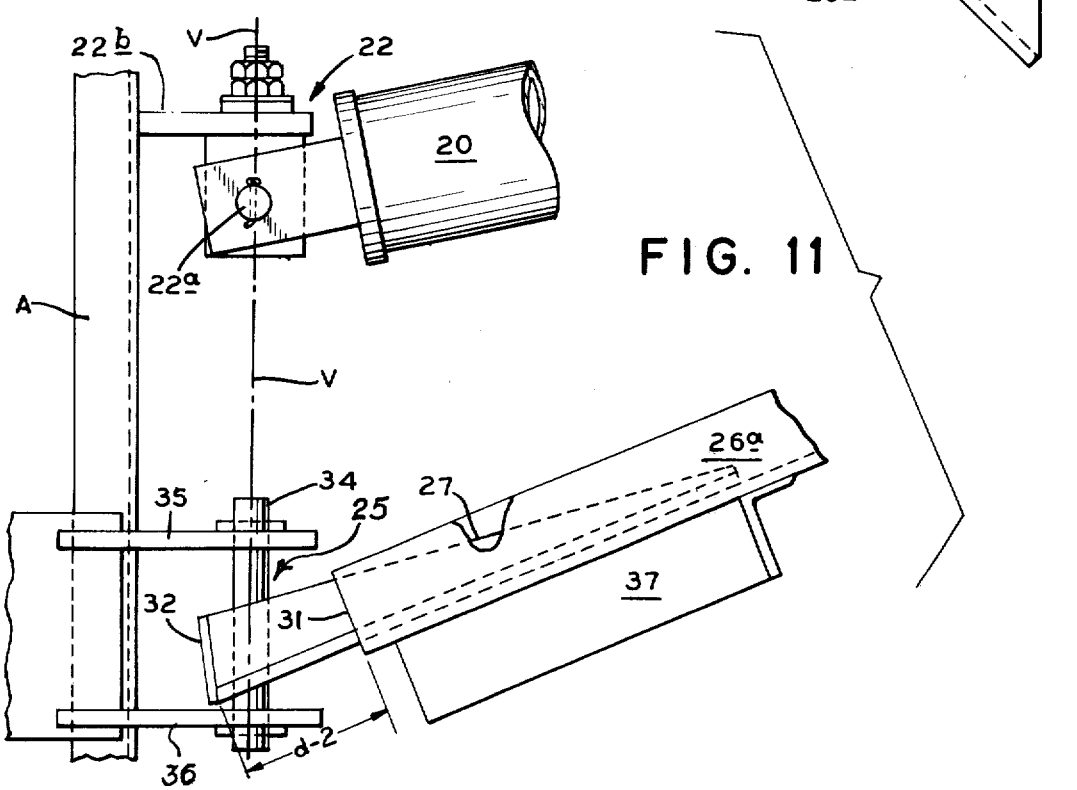

SEDIMENTATION TANK WITH ROTARY YIELDABLE RAKE ARM STRUCTURE

This invention relates to continuously operating sedimentation tanks wherein the settled solids or sludge are continuously removed from the tank bottom by means of a rotary rake structure conveying the sludge to a central sump for withdrawal, while the solids suspension or feed pulp is centrally supplied through a suitable feedwell arrangement, and separated liquid may overflow at the periphery of the tank.

These sedimentation tanks, for the purposes of this invention, may be of the type wherein the rake structure is operatively supported from an overhead construction or bridge spanning the tank, or else the rake structure may be supported by, and revolve around a center pier rising from the bottom of the tank.

In the bridge-supported rake structure a vertical depending rake shaft with its rake arms is rotatably supported from a drive head for rotation about a vertical axis, the drive head in turn being mounted on the bridge. In the pier-supported type, the rake arms extend from a central vertical cage portion of the rake structure, which cage portion surrounds the pier and is rotatably supported from the drive head mounted atop the pier.

Another type employs a traction driven arm carrying the sludge raking means, the inner end of which arm through a bearing, rests on a center pier, while the outer end is propelled along a circular track atop the circular wall of the tank.

More particularly, this invention is concerned with improvements is continuous sedimentation tanks of a type such as represented in U.S. Pat. to Klopper No. 3,295,835 of Jan. 3, 1967. In distinction from the more conventional rotary rake structures, the Klopper type machine employs rotating drive arms also termed torque arms, which have rearwardly and downwardly extending draft elements or ropes connecting them to respective straight linear or tubular rake arms having raking blades welded directly thereto. Each of these bladed rake arms in the patent has a compound or double pivotal connection herein also termed a dual axis hinge connection with the vertical shaft depending from an overhead bridge spanning the tank, the bridge also carrying the drive mechanism for the shaft.

In operation, the double pivotal connection in the prior Klopper construction, prevents the rake arm from turning about its own longitudinal axis, but allows the arm to swing about an horizontal axis, as well as sideways about a vertical axis. In this way, when the torque arms are rotated, the bladed linear rake arms thus being dragged about the vertical axis of the tank, will yield to overload by overriding undue sludge accumulation. This load yielding principle of the Klopper machine avoids problems encountered in settling tanks equipped with rigid three-dimensional girder arm structures, especially when operating in a sludge thickening zone of heavy sediment for example metallurgical sludges.

Whereas in the Klopper patent the rake structure is shown supported from an overhead bridge spanning the tank, the present improvement, by way of illustration and example is shown embodied in a center pier supported rake structure, with drive mechanism mounted on the pier. Yet, also a machine having a traction-driven drive arm, may embody this invention.

Normally the straight linear bladed rake arm of the Klopper type machine, operates on a tank bottom surface of a simple relatively shallow conical slope such as may aid in moving the sludge over the tank bottom into a collecting zone and thus to a central bottom sludge outlet means.

Yet, when handling heavy sediment, for example metallurgical sludges, in a large settling tank, a tank bottom of socalled compound slope may be required. The term compound slope is indicative of a bottom surface which comprises an outer annular zone of near horizontal or very shallow conical slope or pitch, surrounding an inner zone of relatively much steeper conical slope adapted to provide additional help in collecting and moving the sludge to the point of discharge.

It is one object of this invention, to utilize the above stated principle of the Klopper type machine in an adaptation to the compound slope of the tank bottom surface.

For that purpose, the invention provides a bladed rake arm structure of angular shape such as to conform to the inclinations of the compound slope. That is to say, one linear bladed leg of the angular shape should operate in the outer shallow bottom zone, moving the sediment inwardly, while the other linear bladed leg operates in the steeper inner zone, handling the sludge accumulation.

However, the problem due to this deviation from the Klopper structure, may be visualized as follows.

Assuming the inner end of the proposed angular shape of the rake arm structure were connected directly to the aforementioned vertical cage by means of the Klopper double pivotal or double hinge connection, then the angular shape of the rake arm pitted against the sludge load, would cause the pull from the torque arms through the draft ropes, to impose a twisting stress upon this angular shape and thus upon the double pivotal connection.

Therefore a novel composite rake arm structure is provided, which overcomes that problem, even while embodying the draft and drag principle employed in the Klopper type machine.

In a preferred embodiment, such a composite rake arm structure comprises as a basic component element; a straight linear tubular arm generally similar to that of the Klopper machine, insofar as the inner end of that arm is connected to the cage by the aforementioned double pivotal connection. However, the inner end portion of this arm is bare or free of raking blades, as far as it extends across the inner of deep sludge collecting zone, whreas the outer end portion of this arm is provided with Klopper type sediment raking blades adapted to operate in the aforementioned outer shallow settling zone, thus constituting the one or outer leg of the effective angular bladed shape of the rake arm structure.

A complemtary linear bladed member represents the other or inner bladed leg of the angular bladed portion of the composite rake arm structure of this invention. From the basic straight linear arm this complementary bladed member extends inwardly downwardly along the slope of the inner bottom zone, thus constituting with the arm an acute inwardly open angle in a vertical plane. The two linear bladed members form between them an obtuse angle in conformity with the compound slope of the tank bottom.

Additionally, vertical guide means are provided effective between the lower inner end portion of the composite rake structure and the associated portion of the central cage. Such guidance is to compensate for, or to absorb transverse load pressures especially from the sludge load in the inner settling zone, thus leaving the angular rake arm structure unencumbered and free to swing about the horizontal axis. Unless contained in this manner, such transverse load pressures acting eccentrically of the longitudinal axis of the linear straight arm, would impose irregular twisting stresses upon the double pivotal connection.

Other features and advantages will hereinafter appear.

IN THE DRAWINGS

FIG. 1 is a semidiagrammatical vertical sectional view of the settling tank equipped with a center pier supported rotary rake structure as an example embodying the principle of this invention.

FIG. 2 is an enlarged fragmentary vertical sectional view of the tank of FIG. 1, structurally implemented with respect to the operation of the rake arm structure, as related to the compound bottom slope of the tank.

FIG. 3 is a plan view of the tank and rotary rake structure, taken on line 3—3 of FIG. 2.

FIG. 4 is a further enlarged intermediate cross-sectional view taken on line 4—4 in FIG. 2, showing the center pier and surrounding cage having double pivotal connection with the rake arm structure.

FIG. 5 is a lower detail cross-sectional view taken on line 5—5 in FIG. 2, similar to FIG. 4, showing vertical guide means for the rake arm structure, cooperating with the double pivotal connection.

FIG. 6 is an enlarged upper detail cross-sectional view taken on line 6—6 in FIG. 2, showing the rigid connection of the torque arms with the cage.

FIG. 7 is a greatly enlarged fragmentary detail side view of the inner end portion of the composite rake arm structure, showing both its double pivotal connection and the associated vertical guide arrangement.

FIG. 8 is a cross-sectional view taken on line 8—8 in FIG. 7, showing details of the vertical guide arrangement.

FIG. 9 is a part cross-sectional view taken on line 9—9 in FIG. 7 further detailing the vertical guide arrangement.

FIG. 10 is another part cross-sectional view taken on line 10—10 in FIG. 7, further detailing the double-pivotal connection.

FIG. 11 is a fragmentary detail view similar to the one in FIG. 7, but showing the rake arm structure swung upwardly about the horizontal axis of the double pivotal connection.

In the preferred embodiment herein shown to illustrate the invention, a continuously operating sedimentation tank 10 comprises a tank bottom of compound slope 11, a center pier 12, and a rake structure 13 supported for rotation about the center pier. The compound slope of the bottom is defined by an outer annular settline area A-1 of shallow conical inclination, surrounding an inner annular settline area A-2 of steeper conical inclination. The rotary rake structure causes sludge or sediment to be moved from the outer area A-1 to the inner area A-2 which in turn delivers into an annular sump 14 surrounding the center pier that rises from the bottom of the tank. Withdrawal of sludge from the annular sump is indicated by a discharge pipe 16. Feed slurry is supplied to the tank through a feed supply pipe 17. Clarified liquid or supernatant may overflow into peripheral launder 18.

In this embodiment the rotary rake structure comprises a vertical cage 19 surrounding the center pier. A customary drive head 19a is shown mounted atop the pier, supporting the cage and thus the rake structure for rotating the same about the vertical axis of the pier.

The rotary rake structure itself is of a load yieldable kind that utilizes certain aspects of the principle of load yieldability disclosed in the U.S. patent to Klopper No. 3,295,835. According to that principle, a rake structure comprises a central vertical member supported for rotation about the vertical axis of the tank. In that patent, a straight linear tubular bladed rake arm extends from the lower end portion of the vertical member radially over the tank bottom and to the periphery of the bottom slope. Under normal operating conditions, the arm extends adjacent to and parallel to a single relatively gentle conical slope of the tank bottom. A double pivotal connection is provided between the inner end of this linear rake arm and the lower end of the central vertical member, constructed and arranged so as to allow said linear rake arm to swing about a horizontal axis, as well as about a vertical axis, while preventing rotation of said linear arm about its own longitudinal axis. This tubular rake arm in said patent has sludge raking blades directly weld connected thereto.

A drive arm extends rigidly from the upper portion of the vertical member, with draft means connecting it to the linear arm. A device mechanism rotates the central vertical member, thus dragging the rake arm behind it over the tank bottom, thereby causing sediment to be conveyed to a central collecting zone, for delivery therefrom through outlet means in the tank bottom.

By way of contrast, the invention provides a rotary rake structure generally similar to Klopper in the use of a drive arm and linear draft elements to move a load yieldable bladed arm, but constructed and arranged in a novel manner whereby the rake structure is rendered capable of operating properly on a tank bottom having the aforementioned compound slope. Also, by way of distinction from Klopper, the invention is shown embodied in a rake structure connected to a cage supported for rotation on a center pier, with a drive head for the rake structure mounted atop the pier.

Accordingly, in the present embodiment, an improved rotary rake structure comprises that is herein termed a composite bladed rake arm structure connected in a special novel manner to the lower end portion of the vertical cage. In order to conform to the respective inclinations of the compound slope of the tank bottom, this rake arm structure is shown to comprise a linear straight arm 20, preferably in the form of a tubular member, having an outer end portion 21 of the length L-1 provided with sediment raking blades 20a adapted to convey sludge of sediment from the outer annular area A-1 to the inner area A-2 of the tank bottom. Accordingly, this arm 20 may normally have an inclination substantially equal to that of the outer area A-1, extending substantially parallel and adjacent thereto.

The complementary of bare inner portion L-2 of the length of the arm, traverses or extends above the adjacent portion of the inner settling area A-2, and is connected to the vertical cage 19 by means of a double-pivotal connection 22 supported by braket plate 22b (see FIG. 7). This arm therefore is swingable about the horizontal axis H-H (see FIG. 10) as well as about a vertical axis V-V (see FIG. 7).

A complementary linear bladed member 23 extends along the slope or inclination of the inner settling zone A-2 thus with the outer bladed length L-1 of the tubular arm forming the obtuse angle $\alpha$ in a vertical plane. This represents what is herein termed the composite rake arm structure "R-1" constructed and arranged to operate in conformity with the compound slope of the tank bottom.

A drive arm 24 extends rigidly from the upper end portion of the cage. Draft means or a plurality of rearwardly downwardly extending linear draft elements 25a connect the cage with the composite rake arm structure R-1.

A flexible linear element or guy wire 23a extending from the cage supports the rake arm, determining the normal lowermost position relative to the tank bottom.

However, and according to the invention, in order to counteract or compensate for stresses acting eccentrically upon this composite rake arm structure when pushing the load, there is provided a vertical guide connection 25 between the inner end of the complementary linear bladed member 23 and the vertical cage. Against any such twisting force from the sludge load, this slide connection 23 maintains the composite rank structure in the proper vertical radial plane, while being allowed to swing about the aforementioned horizontal axis as between the lower normal position (see FIG. 7) and an upper load responsive position (see FIG. 8) such as may occur when the rake arm yields to an excess sludge accumulation, as is indicated in the dot-and-dash position of the arm in FIG. 1.

Otherwise expressed, the composite rake arm structure of this invention comprises a bladed rake arm member of angular shape conforming to the respective inclinations of the compound slope of the tank bottom. An obtuse angle $\alpha$ is thus formed by the linear outer bladed length L-1 or outer leg and the linear inner bladed length of this angular bladed member. From an intermediate portion or else from the apex portion of the angular bladed member extends a linear support member constituting with the inner bladed leg of the bladed angular member an acute angle $\beta$ in the vertical radial plane. The inner end of this linear support member is connected to the vertical cage structure by means of a double-pivotal connection such as shown and previously described. The inner end of the angular bladed rake member, however, has vertical guide relationship with the lower end portion of the cage structure in the manner shown and previously described.

From the structural details of FIGS. 4 through 11 of this embodiment, it is seen that the vertical cage 19 is in the form of a vertical box structure of generally square cross-sectional configuration. Accordingly, this cage consists of structural steel members comprising four vertical corner members A, B, C and D suitably interconnected by means of transverse and diagonal bracing members.

A pair of drive arms 24 and 24a (see FIG. 6) extend in opposite directions and thus from opposite sides "a" and "b" of the cage. Side a is defined by vertical corner members A and B, side b is defined by vertical corner members C and D. The respective associated composite rake arms R-2 and R-3 extend from the corner members A and C of respective sides a and b (see FIGS. 4 and 5), thus trailing behind the respective associated drive arms 24 and 24a.

As seen in detail FIGS. 7, 8, and 9, the complementary bladed linear member 23 of FIG. 2 may be of a shape other than the tubular shape of the hinge connected arm 20. Accordingly, this bladed member is shown to comprise a structural member of upwardly open channel shaped profile 26a. In the glide connection 25, a bracket member 27 comprises an elongate base plate 28 fixed to the inner bottom face of the channel shape. A pair of parallel upstanding ribs 29 spaced from each other the distance d-1 are unitary with the base plate, thus in turn constituting with the base plate a channel 30 extending within, and parallel to the channel shape of member 26a. The parallel ribs 29 project a distance d-2 longitudinally beyond the transverse end face 31 of channel member 26a. These projecting end portions of the ribs with an end plate 32, thus form between them an elongate vertical passage or slot 33 (see FIG. 8). Through this passage, extends a vertical guide pin 34 the ends of which are held fixed in respective upper and lower horizontal bracket plates 35 and 36 rigidly extending from the respective vertical corner member A of the cage structure. Sediment raking blades 37 (see detail FIGS. 5, 8, and 9) are fastened to the flat bottom face of channel member 26a. From FIGS. 7 and 8 it is seen that there is provided a functionally coaxial relationship between the vertical axis V—V of the double pivotal connection 22 and the vertical axis of guide pin 34. This relationship allows the bladed rake arm member to move in the vertical plane about the horizontal axis H—H of the double pivotal connection 22, as well as to move sideways or in a horizontal plane about the vertical axis V—V of the double pivotal connection 22.

It will also be understood that the invention need not be limited to various structural details. For example, in the gluide connection 25, the guide pin 34 may be replaced functionally by a vertical member of square or rectangular cross-sectional configuration, having coaxial pivotal ends turnable in the respective bracket plates 35 and 36 on the cage. This would allow for horizontal movement of the rake arm, while guidance in the vertical plane is provided by the vertical member occupying the width d-1 of slot 33. Also, the relationship of the parts could be reversed, for example by providing said vertical turnable member with a vertical slot, with a rearward or tail end extension of bladed member 23 extending into said slot.

The extreme lower end of the vertical cage structure has fastened thereto and extending downwardly therefrom a set of auxiliary blades 38 effective in the annular sump to move sludge therein to the point of discharge through the withdrawal pipe 16.

A usual stationary bridge 39 is shown to provide access from the tank wall to the drive mechanism on the center pier.

I claim:

1. In a continuously operating settling tank having supply means for feeding a suspension to the tank for separation, overflow means for delivering supernatant separated from sludge settling on the tank bottom, said tank bottom having a settling surface presenting a compound slope wherein a shallow outer annular settling zone surrounds a steeper conical inner settling zone, a center pier rising from said inner zone, a sludge sump surrounding the foot end of said pier, and sludge outlet means connected to said sump, a rotary rake structure which comprises a vertical cage surrounding said center pier substantially concentric therewith and supported on said pier for rotation about the vertical axis, at least one drive arm extending from the upper portion of said cage, a linear arm extending from the lower end portion of the cage radially across said outer zone, said arm having an outer end portion provided with raking blades adapted to move sediment from said outer annular zone to said inner zone during rotation of said arm about the vertical axis, a double pivotal connection between the inner end of said linear arm and said cage, allowing said arm to swing about an horizontal axis in a vertical plane, as well as sideways abouts a vertical axis, a complementary linear bladed member extending from said linear arm rearwardly downwardly along the slope of said inner zone, and constituting with said linear arm a rigid composite bladed rake arm structure conforming to the respective inclinations of the compound slope of the tank bottom, guide means provided and effective between the inner end of said complementary linear bladed member and said cage, said guide means being constructed and arranged so as to allow said bladed rake arm to move in a vertical plane about said horizontal axis, as well as to move in a horizontal plane about said vertical axis, linear flexible support means extending between said cage and the rake arm structure, and arranged to determine the normal lowermost position of said rake arm structure relative to the tank bottom, draft means connecting said drive arm with said composite rake arm structure in a manner effective to drag said rake arm structure over the tank bottom incident to the rotation of said cage, said drive means for rotating said cage together with said rake structure.

2. The rotary rake structure according to claim 1, wherein said complementary bladed linear member has a rear end portion formed with a vertical longitudinally extending slot, and wherein a vertical guide pin is provided on the adjacent portion of the cage, extending through said slot in guide relationship therewith, allowing for movement of said bladed rake arm structure in said vertical and horizontal planes.

3. The rotary rake structure according to claim 1, wherein said cage is of square shaped cross-sectional configuration, wherein said drive arm extends from one side of the square cross-sectional shape, as defined by the respective two corners of the square, and wherein said composite rake arm structure extends from one of said corners of the square, trailing behind the associated drive arm, 4. The rotary rake structure according to claim 1, wherein said drive means are mounted on said pier.

5. In a continuously operating settling tank having supply means for feeding a suspension to the tank for separation, overflow means for delivering supernatant separated from sludge settling on the tank bottom, said tank bottom having a settling surface presenting a compound slope wherein a shallow outer annular settling zone surrounds a steeper conical inner settling zone, a center pier rising from said inner zone, a sludge sump surrounding the foot end of the pier, and sludge outlet means connected to said sump, a rotary rake structure which comprises a vertical cage surrounding said pier substantially concentric therewith, and supported on said pier for rotation about a vertical axis, at least one drive arm extending from the upper portion of said cage, a bladed rake arm member of angular shape conforming to the respective inclinations of said compound shape when maintained in a vertical plane, a linear support member extending rigidly from an intermediate portion of said angular rake arm member towards said cage, and forming with the adjacent leg of said annular shape an acute angle in said vertical plane, said linear support member constituting with aid annular rake member a composite rake arm structure, a double privotal connection effective between the inner end portion of said linear support member and the adjacent portion of the cage, said pivotal connection allowing said composite rake structure to swing about an horizontal axis in said vertical plane, as well as sideways about a vertical axis, guide means provided and effective between the inner end of said bladed angular rake arm member and said cage, said guide means being constructed and arranged so as to allow said rake arm member to move in a vertical plane about said horizontal axis, as well as to move in a horizontal plane about said vertical axis, linear flexible support means extending between said cage and said composite rake arm structure, and arranged so as to maintain the normal lowermost position of said rake arm structure relative to the tank bottom, draft means connecting said drive arm with said composite rake arm structure in a manner effective to drag said rake arm structure over the tank bottom during rotation of said cage, and drive means for rotating said cage together with said rake structure.

6. The rotary rake structure according to claim 5, wherein said blade rake arm member of angular shape has a rear end portion formed with a vertical longitudinally extending slot, and wherein a vertical guide pin is provided on the adjacent portion of the cage, extending through said slot in guide relationship therewith, allowing for movement of said bladed rake arm structure in said vertical and horizontal planes.

7. The rotary rake structure according to claim 5, wherein said cage is of square shaped cross-sectional configuration, wherein said drive arm extends from one side of the square cross-sectional shape, as defined by the respective two corners of the square, and wherein said composite rake arm structure extends from one of said corners of the square, trailing behind the associated drive arm.

8. The rotary rake structure according to claim 5, wherein said drive means are mounted on said pier.

9. In a continuously operating settling tank having supply means for feeding a suspension to the tank for separation, overflow mans for delivering supernatant separated from sludge settling on the tank bottom, said tank bottom having a settling surface presenting a compound slope wherein a shallow outer annular settling zone surrounds a steeper conical inner settling zone, and means for discharging collected sludge from the bottom of said inner zone, a rotary rake structure which comprises a vertical member supported for rotation about a vertical axis centrally of the tank, at least one drive arm extending from the upper portion of said cage, a linear arm extending from the lower end portion of said vertical member radially across said outer zone said arm having an outer end portion provided with raking blades adapted to move sediment from said outer annular zone to said inner zone during rotation of said arm about said axis, a double pivotal connection between innter end of said linear arm and said cage, allowing said arm to swing about horizontal axis, as well as sideways about vertical axis, a complementary linear bladed member extending from said linear arm rearwardly downwardly along the slope of said inner zone, and constituting with said linear arm a rigid composite bladed rake arm structure conforming to the respective inclinations of the compound slope of the tank bottom, guide means provided and effective between the inner end of said complementary linear bladed member and said cage, said guide means being constructed and arranged so as to allow said bladed rake arm member to move in a vertical plane about said horizontal axis, as well as to move in a horizontal plane about vertical axis, linear flexible support means effective between said cage and the rake arm structure, and arranged to determine the normal lowermost position of said structure relative to the tank bottom, draft means connecting said drive arm with said composite rake arm structure in a manner effective to drag with said rake arm structure over the tank bottom incident to the rotating of said cage, and drive means for rotating said cage together with said rake arm structure.

10. The rotary rake structure according to claim 9, wherein said complementary bladed linear member has a rear end portion formed with a vertical longitudinally extending slot, and wherein a vertical guide pin is provided on the adjacent portion of the cage, extending through said slot in guide relationship therewith, allowing for movement of said bladed rake arm structure in said vertical and horizontal planes.

11. In a continuously operating settling tank having supply means for feeding a suspension to the tank, overflow means for delivering supernatant separated from sludge settling on the tank bottom, said tank bottom having a settling surface presenting a compound slope wherein a shallow outer annular settling zone surrounds a steeper conical inner settling zone, and means for discharging collected sludge from the bottom of said inner zone, a rotary rake structure which comprises a vertical member supported for rotation about a vertical axis centrally of the tank, at least one drive arm extending from the upper portion of said vertical member, a bladed rake arm member of angular shape conforming to the respective inclinations of said compound shape when maintained in a vertical plane, a linear support member extending from an intermediate portion of said angular rake arm member towards said cage, and forming with the adjacent leg of said angular shape an acute angle in said vertical plane, said linear support member constituting with said angular rake member a composite rake arm structure, a double pivotal connection effective between the inner end portion of said linear support member and the adjacent portion of said vertical member, said pivotal connection allowing said composite rake structure to swing about a horizontal axis, as well as sideways about a vertical axis, guide means provided and effective between the inner end of said complementary linear bladed member and said cage, said guide means being constructed and arranged so as to allow said bladed rake arm member to move in a vertical plane about said horizontal axis, as well as to move in a horizontal plane about said vertical axis, linear flexible support means extending between said vertical member and said composite rake arm structure, and arranged so as to maintain the normal lowermost position of said rake arm structure relative to the tank bottom, draft means connecting said drive arm with said composite rake arm structure in a manner effective to drag said rake arm structure over the tank bottom during rotation of said vertical member, and drive means for rotating said vertical member together with said rake structure.

12. The rotary rake structure according to claim 11, wherein said complementary bladed linear member has a rear end portion formed with a vertical longitudinally extending slot, and wherein a vertical guide pin is provided on the adjacent portion of the cage, extending through said slot in guide relationship therewith, allowing for movement of said bladed rake arm structure in said vertical and horizontal planes.

* * * * *